Patented Feb. 16, 1943

2,311,067

UNITED STATES PATENT OFFICE 2,311,067

SATURATED AND UNSATURATED 17-HYDROXY-ANDROSTANES, THEIR DERIVATIVES AND SUBSTITUTION PRODUCTS, AND PROCESS OF MAKING SAME

Karl Miescher, Riehen, and Albert Wettstein, Basel, Switzerland, assignors to Ciba Pharmaceutical Products, Incorporated, Summit, N. J., a corporation of New Jersey No Drawing. Application December 26, 1940, Serial No. 371,833. In Switzerland December 23, 1939

9 Claims. (Cl. 260—397.5)

It has been found that saturated or unsaturated 17-hydroxy-androstanones, their derivatives (for example, esters or ethers) or their substitution products with saturated or unsaturated hydrocarbon radicals may be obtained by treating an androstane-17-one, containing in the rings A and B merely free or substituted tertiary hydroxyl groups, with agents capable of transforming the group —CO— into the group —CR(OH)—, R representing hydrogen or a saturated or unsaturated hydrocarbon radical, causing the products thus obtained to react with water, acid or alcohol eliminating agents in order to eliminate the free or substituted tertiary hydroxyl groups in rings A or B, hereupon treating with oxidising agents, and finally, if desired, further treating with hydrolysing and/or oxidising, dehydrogenating, water and acid eliminating agents. During this process, the 17-carbinols may be converted if desired either during, before or after the elimination of the teritary hydroxyl groups in rings A and B, into their esters or ethers by the action of esterifying or etherifying agents.

The parent substances mentioned may be obtained, for example, by the degradation of the side chain in corresponding dimethyl-cyclopentanopolyhydrophenanthrene compounds containing side chains according to the description in patent application Serial No. 371,058, filed December 20, 1940. They contain, particularly in the 5-position, or, for example, in the 8-position, a tertiary hydroxyl group which may also be esterified by inorganic or organic acids or may be etherified by phenols or alcohols.

Agents which are capable of transforming the —CO— group into the —CR(OH)— group, R having the meaning given above, are reducing agents in the widest sense of the term, as well as, for example, metallo-hydrocarbon compounds, such as Grignard compounds, alkali-hydrocarbons and the like, which, in addition to the reduction of the 17-keto group, are capable of introducing in the same position an additional saturated or unsaturated hydrocarbon radical, for example, a methyl, ethyl, allyl, or acetylene group. The 17-carbinols thus obtained, particularly those containing secondary alcohol groups, are, if desired, in this stage or only after the elimination of the teritary hydroxyl groups, converted into their corresponding esters or ethers in known manner by the action of esterifying or etherifying agents. In this instance particular use is made of esterifying agents which are capable of introducing aliphatic acid radicals, such as those of formic, acetic, propionic, n- or iso-butyric, n- or iso-valeric, capric, caproic, palmitic, or stearic acids, as well as aromatic, fatty aromatic or inorganic acid radicals, for example, benzoic acid, cinnamic acid or substituted carbonic acid radicals. For the purpose of etherification, aliphatic or aliphatic-aromatic alcohols or phenols are introduced, for example, methyl, ethyl, benzyl alcohols, triaryl-methyl carbinols and the like. The products are now treated in known manner with water, alcohol or acid eliminating agents, whereby, for example 4:5- or 5:6-unsaturated compounds are formed.

Upon the unsaturated reaction products obtained oxidising agents are now caused to react, in particular those capable of introducing oxygen or groups containing oxygen in known manner in the α-position to the double bond. For this purpose, as known for example, chromic acid, selenium dioxide, or lead tetraacylates may be used, which lead to compounds containing oxo, hydroxy or substituted hydroxyl groups in the α-position to the double bond. In place of these, however, oxidising agents may also be caused to react upon the unsaturated products which are capable of adding oxygen or groups containing oxygen directly or indirectly to the double bond itself. For this purpose are suitable, for instance, peroxides, such as hydrogen peroxide, if desired, in the presence of alkalis or metal oxides, furthermore per-acids, halogens, metal oxides, such as osmium tetroxide, if desired, in the presence of chlorates, also permanganates, lead tetracylates or halogen-silver benzoate complexes. In order to convert, for example, newly introduced epoxy groupings or substituted hydroxyl groups into free hydroxyl groups, the reaction products are further treated with hydrolysing agents, it being also possible, by cautious working, only partially to hydrolyse the substituents in rings A or B but not the possibly substituted hydroxyl group in the 17-position. Therefore, in these cases, it is advantageous if the 17-carbinol group has already been substituted by a difficultly hydrolysable radical.

In this way, compounds of the dimethyl-cyclopentanopolyhydrophenanthrene series have been obtained which contain a free, esterified or etherified hydroxyl group and furthermore, if desired, also a hydrocarbon radical in the 17-position, and which contain in rings A or B keto groups or free or esterified hydroxyl groups in the α-position to double bonds, or else two adjacent free or esterified hydroxyl groups in rings A or B. From the compounds which contain hydroxyl groups, the desired ketones, saturated or unsaturated 17-hydroxy-androstanones, their derivatives or substitution products, may subsequently be obtained in a manner of itself known by the action of agents which eliminate water or acid or by the action of oxidising or dehydrogenating agents.

The following scheme illustrates by means of formulae one of the above reactions without in any way restricting it:

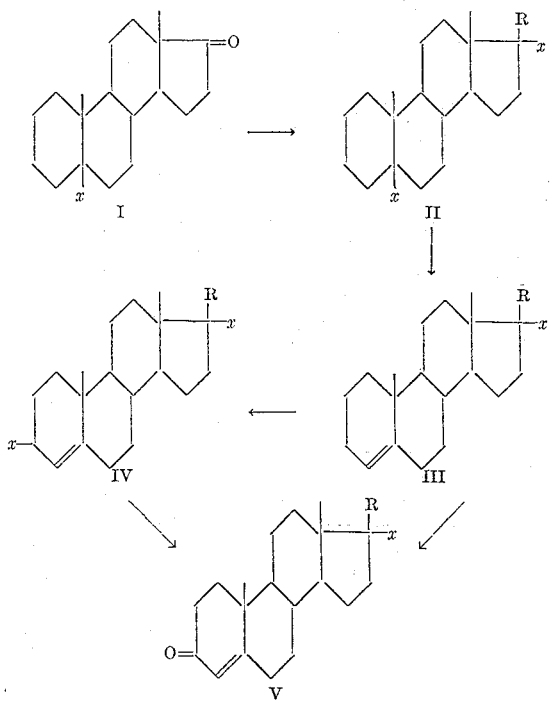

$x$=free or substituted hydroxyl groups.
R=hydrogen, saturated or unsaturated hydrocarbon radical.

*Example 1*

1 part of 5-hydroxy-androstane-17-one of Formula I ($x$=OH; prepared, for example, according to patent application Serial No. 371,058, by splitting the side chain in 5-hydroxy-cholestane) is hydrogenated in 25 parts of pure alcohol by means of a nickel catalyst, prepared, for example, according to the method of Rupe or Raney. After 1 molecule of hydrogen has been absorbed, the hydrogenation is stopped, and the catalyst is removed by filtration. The filtrate is then evaporated in vacuo and the residue is dissolved in di-isopropyl ether and allowed to crystallise. In this manner, androstane-5:17-diole is obtained of Formula II ($x$=OH; R=H). This compound is now heated for 2 hours with 10 parts of boiling propionic acid anhydride, the secondary hydroxyl group thus being acylated but the tertiary being split off as water. The reaction mixture is then poured into water and, after the anhydride has decomposed, the ester which crystallises is filtered off at the pump, washed with water and dried in the vacuum exsiccator. By recrystallisation from hexane, $\Delta^4$-androstene-17-ole-propionate is obtained in colourless crystals (Formula III; $x$=—OCO.C$_2$H$_5$; R=H), in addition to some $\Delta^5$-androstene-17-ole-propionate.

In place of a catalytic method, other reduction methods known to be suitable for the conversion of a keto group into a carbinol group may be used, for example, nascent hydrogen like an alkali metal and an alcohol, an organo-metal compound prone to the formation of unsaturated hydrocarbons, like iso-propyl magnesium iodide, or even biochemical or electrochemical methods. Instead of propionic acid anhydride, other propionylating agents may naturally be used, for instance, a propionic acid halide, or other esters or even ethers may be prepared.

In place of the radical of propionic acid, other ester or ether radicals may be introduced, for example those named before, or the new carbinol group may rest unprotected if suitable oxidising agents, for example, selenium dioxide, are chosen for the following oxidation.

Instead of eliminating the tertiary hydroxyl group during the acylation of the secondary hydroxyl, the elimination may be carried out before the acylation, for example, by means of an alcoholic solution of hydrogen halide, or after the acylation has been carried out gently, for example, by means of propionic acid anhydride in pyridine at room temperature.

Instead of using 5-hydroxy-androstane-17-one as parent material, use may be made of a compound having a substituted hydroxyl group, for example, an esterified or etherified hydroxyl, in the 5-position, for instance, a 5-halogen-androstane-17-one. In this case agents which eliminate acid or alcohol, for example, alkalies or carbonic acid salts, are allowed to react with the reaction product, thus obtaining the same end products.

If, in place of the 5-hydroxy-androstane-17-one, a parent material be used which is hydroxylated in another position, for instance, 8-hydroxy-androstane-17-one, its esters or ethers, the corresponding unsaturated product is obtained.

Thus quite generally as intermediates androstane derivatives may be obtained containing in the rings A and B, for example in 5-position, merely free or substituted tertiary hydroxyl groups, which are eliminated later, and in 17-position a free, esterified or etherified hydroxyl group, for example, an acylated hydroxyl group.

1 part of this $\Delta^4$-androstene-17-ole-propionate described is dissolved in 50 parts of glacial acetic acid, a solution of 1.2 parts of chromium trioxide in a little water is added and the whole is stirred at room temperature for 12 hours. 400 parts of water are now added and the reaction mixture is extracted exhaustively with ether; the ethereal solution is washed with bicarbonate solution and with water, is dried and then evaporated in vacuo. By fractional crystallisation, absorption or sublimation, testosterone propionate ($\Delta^4$-androstene-3-one-17-ole-propionate, of Formula V; $x$=—OCO—C$_2$H$_5$:R=H), together with the corresponding 6-oxo- and 3:6-dioxo-compounds, is obtained from the residue.

In place of chromic acid, selenium dioxide or a lead tetraacylate, for example, may be used for the oxidation. In this case, a $\Delta^4$-3-hydroxy- or acyloxy-androstene-17-ole-propionate of Formula IV is primarily obtained, which subsequently, if necessary, after partial hydrolysis of only the 3-ester group, may also be converted into testosterone propionate in a manner of itself known by the action of oxidising or dehydrogenating agents.

*Example 2*

A solution of excess of methyl-magnesium iodide in ether is dropped into a solution of 1 part of 5-chloro-androstane-17-one of Formula I (prepared, for example, according to patent application Serial No. 371,058, by splitting the side chain in 5-chloro-cholestane). After the reaction has taken place, water and acid are cautiously added, the ethereal solution is removed, washed and evaporated. The residue is heated to the boil for 1 hour with 20 parts of methanolic caustic potash solution of 5 per cent strength in order to obtain complete elimination of hydrochloric acid from the 5-chloro-17-methyl-androstane-17-ole of Formula II ($x$=OH;Cl; R=CH$_3$) which is formed as an intermediate product. The solution is poured into water, extracted with ether, the ethereal solution is washed with water, dried and evaporated. Δ$^4$-17-methyl-androstene-17-ole of Formula III ($x$=OH; R=CH$_3$) is obtained from the residue.

In a completely analogous manner, compounds containing instead of a methyl other saturated or unsaturated hydrocarbon radicals may be obtained, for example, the 17-ethyl-, 17-ethinyl- or 17-allyl-androstane-17-oles with free or substituted tertiary hydroxyl groups, for example, in 5, 8 or 9-position by reaction with, for example, ethyl, ethinyl or allyl magnesium halides on the correspondingly substituted androstane-17-ones.

By energetic action of esterifying or etherifying agents, for example, the new tertiary carbinol groups in 17-position may be converted into ester or ether groups in known manner.

So quite generally as intermediates androstane derivatives may be obtained containing in the rings A and B, for example in 5-position, merely free or substituted tertiary hydroxyl groups, which are eliminated later, and in 17-position a free, esterified (like acylated) or etherified hydroxyl group and a hydrocarbon residue, like a methyl or an ethinyl group.

The Δ$^4$-17-methyl-androstene-17-ole, described above, is converted directly into 17-methyl-testosterone of Formula V ($x$=OH; R=CH$_3$) in a manner fully analogous to that described in Example 1 for the Δ$^4$-androstene-17-ole-propionate, for example, by means of chromic acid, or it may be converted into Δ$^4$-17-methyl-androstene-3:17-diole or its 3-monoesters (Formula IV), for example, by the action of selenium dioxide or a lead tetraacylate. These may then, if necessary, after hydrolysis, be converted also into 17-methyl-testosterone in a manner of itself known, by means of oxidising or dehydrogenating agents. If, in place of the Δ$^4$-17-methyl-androstene-17-ole, corresponding compounds, containing for example, an ethyl, ethenyl, ethinyl, or allyl group in the 17-position be used as parent materials, then, for example, the 17-ethyl-, 17-ethenyl-, 17-ethinyl-, or 17-allyl-testosterone is obtained in an analogous manner.

Instead of the introduction of a keto or free or substituted hydroxyl group in the α-position to the double bond, two hydroxyl groups may also be added at the latter. To this end, the Δ$^4$-17-methyl-androstene-17-ole is treated, for example, in ethereal solution with an ethereal solution of 1.1 equivalents of osmium tetroxide, allowing the reaction mixture to stand 5 days at room temperature, after which the solution is evaporated completely at a bath temperature of 30° C. The residue is heated for 2 hours with an aqueous-alcoholic solution of sodium sulphite. For the reductive hydrolysis of the osmic acid ester other reducing agents, for example, acid agents such as ascorbic acid, or formic acid, may also be used. The reduction mixture is poured into water and extracted exhaustively with chloroform; the chloroform solution is purified from the last traces of colloidal osmium by means of an acid absorption agent and is then evaporated to dryness. The crude 17-methyl-androstane-4:5:17-triole is obtained from the residue.

Instead of the direct addition of two hydroxyl groups at the double bond, an oxide ring may first of all be added or one or both of the hydroxyl groups in substituted form, for example, in the acylated state, the reagents already described, for example, being used in a manner of itself known for this purpose. The oxide rings or substituted hydroxyl groups may subsequently be hydrolysed if desired, the latter either completely or partially.

For the last stage of the process, an agent capable of eliminating water is allowed to react upon the 17-methyl-androstane-4:5:17-triole. If the hydroxyl group or groups be present in the esterified form in the 4 and/or 5-position which, for example, is the case if peracetic acid, a lead tetraacylate or a halogen-silver benzoate complex has been used for the hydroxylation, then, instead of an agent eliminating water, an agent eliminating acid is used, for example, alkali, or zinc dust in toluene. In this manner 17-methyl-androstane-4-one-17-ole is obtained.

What we claim is:

1. A process of the character described which comprises treating an androstane-17-one, containing in the rings A and B merely a tertiary hydroxyl group, with an agent capable of transforming the group —CO— into the group —CH(OH)—, and causing the product thus obtained to react with a water-eliminating agent and then with an oxidizing agent.

2. A process of the character described which comprises treating an androstane-17-one, containing in the rings A and B merely a tertiary hydroxyl group, with an agent capable of transforming the group —CO— into the group —CH(OH)—, then with an esterifying agent, and causing the product thus obtained to react with a water-eliminating agent and then with an oxidizing agent.

3. A process of the character described which comprises treating an androstane-17-one, containing in the rings A and B merely a tertiary hydroxyl group, with an agent capable of transforming the group —CO— into the group —CH(OH)—, then with an esterifying agent, and causing the product thus obtained to react with a water-eliminating agent and then with an oxidizing agent, and finally with a hydrolyzing agent.

4. A process of the character described which comprises treating an androstane-17-one, containing in the rings A and B merely a tertiary hydroxyl group, with an agent capable of transforming the group —CO— into the group —CH(OH)—, and causing the product thus obtained to react with a water-eliminating agent, then with an esterifying agent and finally with an oxidizing agent.

5. A process of the character described which comprises treating an androstane-17-one, containing in the rings A and B merely a tertiary hydroxyl group, with an agent capable of transforming the group —CO— into the group —CH(OH)—, and causing the product thus obtained to react with a water-eliminating agent, then with an esterifying agent, then with an oxidizing agent and finally with a hydrolyzing agent.

6. A process of the character described which comprises treating an androstane-17-one, containing in the rings A and B merely a tertiary hydroxyl group, with an agent capable of transforming the group —CO— into the group —CH(OH)—, causing the product thus obtained to react with a water-eliminating agent, then with an esterifying agent, then with an oxidizing agent capable of introducing a hydroxyl group into the α-position of double bonds, and finally with an oxidizing agent.

7. The androstane derivatives containing in the rings A and B merely, a member of the group consisting of free, esterified and etherified tertiary hydroxyl groups and in 17-position the grouping

wherein R' stands for a member of the group consisting of a free, esterified and etherified hydroxyl group.

8. The androstane derivatives containing in the rings A and B merely a tertiary hydroxyl group, and in 17-position a hydroxyl group.

9. The androstane derivatives containing in 5-position a tertiary hydroxyl group, and in 17-position a hydroxyl group.

KARL MIESCHER.
ALBERT WETTSTEIN.